US012614790B2

(12) United States Patent
Lim et al.

(10) Patent No.: US 12,614,790 B2
(45) Date of Patent: Apr. 28, 2026

(54) BATTERY CELL AND BATTERY MODULE COMPRISING SAME

(71) Applicant: LG Energy Solution, Ltd., Seoul (KR)

(72) Inventors: Hun-Hee Lim, Daejeon (KR);
Sang-Hun Kim, Daejeon (KR);
Min-Hyeong Kang, Daejeon (KR);
Dae-Woong Song, Daejeon (KR);
Hyung-Kyun Yu, Daejeon (KR);
Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/565,942

(22) PCT Filed: Jan. 20, 2023

(86) PCT No.: PCT/KR2023/001067
§ 371 (c)(1),
(2) Date: Nov. 30, 2023

(87) PCT Pub. No.: WO2023/140707
PCT Pub. Date: Jul. 27, 2023

(65) Prior Publication Data
US 2024/0266644 A1 Aug. 8, 2024

(30) Foreign Application Priority Data
Jan. 24, 2022 (KR) ........................ 10-2022-0010160

(51) Int. Cl.
*H01M 50/124* (2021.01)
*H01M 50/178* (2021.01)
(Continued)

(52) U.S. Cl.
CPC ..... *H01M 50/1243* (2021.01); *H01M 50/178* (2021.01); *H01M 50/186* (2021.01); *H01M 50/3425* (2021.01)

(58) Field of Classification Search
CPC ........... H01M 50/1243; H01M 50/178; H01M 50/186; H01M 50/3425
See application file for complete search history.

(56) References Cited

U.S. PATENT DOCUMENTS

2004/0224225 A1    11/2004  Yamashita et al.
2014/0011060 A1    1/2014   Yang et al.
(Continued)

FOREIGN PATENT DOCUMENTS

CN        107925033 A      4/2018
JP        2001307715 A     11/2001
(Continued)

OTHER PUBLICATIONS

International Search Report for PCT/KR2023/001067 mailed May 16, 2023. 4 pages.
(Continued)

*Primary Examiner* — Matthew T Martin
*Assistant Examiner* — Ankith R Sripathi
(74) *Attorney, Agent, or Firm* — Lerner David LLP

(57) ABSTRACT

Disclosed is a battery cell, which includes a battery case having an accommodation portion in which an electrode assembly is mounted, and a sealing portion formed by sealing an outer periphery thereof. The battery case further includes an electrode lead electrically connected to an electrode tab included in the electrode assembly and protruding out of the battery case through the sealing portion, and a lead film located at a portion corresponding to the sealing portion in at least one of an upper portion and a lower portion of the electrode lead. The lead film has a dented portion recessed in an outer direction of the battery case and opened toward the inside of the battery case. The battery cell also has a coating layer located on a gas discharge portion of the lead film that contains a fluorine-based polymer.

20 Claims, 6 Drawing Sheets

(51) Int. Cl.
  *H01M 50/186*    (2021.01)
  *H01M 50/342*    (2021.01)

(56)          References Cited

U.S. PATENT DOCUMENTS

| 2014/0199581 A1* | 7/2014 | Ryu ................. H01M 10/0413 |
| | | 429/161 |
| 2016/0028068 A1 | 1/2016 | Yang et al. |
| 2016/0315301 A1 | 10/2016 | Kim et al. |
| 2017/0069902 A1* | 3/2017 | Kim .................... H01M 50/178 |
| 2018/0114964 A1* | 4/2018 | Kim .................... H01M 50/172 |
| 2019/0021161 A1* | 1/2019 | Coakley ................ H05K 1/118 |
| 2020/0119317 A1 | 4/2020 | Nakabayashi et al. |
| 2022/0255186 A1 | 8/2022 | Hwang et al. |

FOREIGN PATENT DOCUMENTS

| JP | 2015511060 A | 4/2015 |
| JP | 2016532991 A | 10/2016 |
| JP | 2018525804 A | 9/2018 |
| JP | WO2018220954 A1 | 4/2020 |
| KR | 20140129600 A | 11/2014 |
| KR | 20140134916 A | 11/2014 |
| KR | 20160036339 A | 4/2016 |
| KR | 20160069177 A | 6/2016 |
| KR | 20160077968 A | 7/2016 |
| KR | 20160126157 A | 11/2016 |
| KR | 20170025872 A | 3/2017 |
| KR | 20170027150 A | 3/2017 |
| KR | 20190022196 A | 3/2019 |
| KR | 20190135349 A | 12/2019 |
| KR | 20210025406 A | 3/2021 |
| KR | 20210064505 A | 6/2021 |

OTHER PUBLICATIONS

Search Report dated Mar. 1, 2024 from the Office Action for Chinese Application No. 202380010704.4 issued Mar. 3, 2024, pp. 1-2.

* cited by examiner (a)

(b)

(a)

(b)

(a)

(b)

(a)

(b)

BATTERY CELL AND BATTERY MODULE COMPRISING SAME

CROSS-REFERENCE TO RELATED APPLICATIONS

The present application is a national phase entry under 35 U.S.C. § 371 of International Application No. PCT/KR2023/001067, filed on Jan. 20, 2023, which claims priority to Korean Patent Application No. 10-2022-0010160, filed on Jan. 24, 2022 in the Republic of Korea, the disclosures of which are incorporated herein by reference.

TECHNICAL FIELD

The present disclosure relates to a battery cell and a battery module including the same, and more particularly, to a battery cell capable of generating a gas generated in the battery cell to the outside, and a battery module including the same.

BACKGROUND ART

As technology development and demand for mobile devices increase, the demand for secondary batteries as an energy source is rapidly increasing. In particular, secondary batteries are of great interest as energy sources not only for mobile devices such as mobile phones, digital cameras, notebooks and wearable devices, but also for power devices such as electric bicycles, electric vehicles and hybrid electric vehicles.

Depending on the shape of a battery case, these secondary batteries are classified into a cylindrical battery and a prismatic battery in which an electrode assembly is included in a cylindrical or prismatic metal can, and a pouch-type battery in which the electrode assembly is included in a pouch-type case of an aluminum laminate sheet. Here, the electrode assembly included in the battery case is a power element including a positive electrode, a negative electrode, and a separator interposed between the positive electrode and the negative electrode, and capable of charging and discharging, and is classified into a jelly-roll type in which long sheet-type positive and negative electrodes coated with an active material are wound with a separator being interposed therebetween, and a stack type in which a plurality of positive and negative electrodes are sequentially stacked with a separator being interposed therebetween.

Among them, in particular, a pouch-type battery in which a stack-type or stack/folding-type electrode assembly is included in a pouch-type battery case made of an aluminum laminate sheet is being used more and more due to low manufacturing cost, small weight, and easy modification.

However, as the energy density of the battery cell increases in recent years, there is a problem that the amount of gas generated inside the battery cell also increases. In the case of the conventional battery cell, a component capable of discharging the gas generated inside the battery cell is not included, so a venting phenomenon may occur in the battery cell due to gas generation. In addition, moisture may penetrate into the battery cell damaged by the venting, which may cause side reactions, and there is a problem that battery performance deteriorates and additional gas is generated.

In order to solve this problem, various methods have been devised for discharging the gas generated inside the battery cell to the outside of the battery cell, but there is a problem in that the gas is released to the outside of the battery cell and moisture penetrates into the battery cell at the same time.

Accordingly, there is a growing need to develop a battery cell capable of discharging the gas generated inside the battery cell to the outside and preventing moisture from penetrating into the battery cell.

DISCLOSURE

Technical Problem

The present disclosure is directed to providing a battery cell having an improved external discharge amount of gas generated in the battery cell and capable of preventing moisture penetration into the battery cell, and a battery module including the same.

The object to be solved by the present disclosure is not limited to the above-mentioned object, and the objects not mentioned here may be clearly understood by those skilled in the art from this specification and the accompanying drawings.

Technical Solution

In one aspect of the present disclosure, a battery cell is provided.

The battery cell comprises a battery case having an accommodation portion in which an electrode assembly is mounted, and a sealing portion formed by sealing an outer periphery thereof; an electrode lead electrically connected to an electrode tab included in the electrode assembly and protruding out of the battery case through the sealing portion; and a lead film located at a portion corresponding to the sealing portion in at least one of an upper portion and a lower portion of the electrode lead, wherein the lead film has a dented portion recessed in an outer direction of the battery case and opened toward the inside of the battery case, and the battery cell comprises a coating layer located on a gas discharge portion of the lead film and containing a fluorine-based polymer.

The gas discharge portion of the lead film may be located outer than an outer surface of the battery case.

The dented portion may include a first dented portion and a second dented portion, and the second dented portion may have a greater width than the first dented portion.

The second dented portion may be located farther from the portion where the electrode assembly is accommodated than the first dented portion.

A part of the first dented portion may be located in an area corresponding to the sealing portion.

A part of the second dented portion may be located in an area that does not correspond to the sealing portion.

An end of the second dented portion outside the battery case may be located outer than an outer surface of the battery case.

The second dented portion may be located between an end of the sealing portion and an end of the lead film.

The coating layer may be located on the second dented portion.

The first dented portion may extend along a protruding direction of the electrode lead, and the second dented portion may extend along a longitudinal direction of the sealing portion.

The fluorine-based polymer may include a polymer containing repeating units derived from tetrafluoroethylene, vinyl fluoride, vinylidene fluoride, or monomers of two or more thereof.

The coating layer may have a thickness of 0.1 µm to 2 mm.

Based on a protruding direction of the electrode lead, an inner surface of the dented portion may be closed.

The battery cell may further comprise an inner layer configured to cover at least one of inner surfaces of the dented portion of the lead film.

The material of the inner layer may have a higher melting point than the material of the lead film and may not react with an electrolyte.

The lead film may include a polyolefin-based material.

The inner layer may include at least one material among polyolefin-based, fluorine-based, and porous ceramic-based materials.

The dented portion may be located on the electrode lead.

The length of the lead film may be greater than the width of the electrode lead.

The dented portion may be located between an end of the electrode lead and an end of the lead film.

An end of the dented portion that is open toward the inside of the battery case may be located inner than an inner surface of the battery case.

Based on a protruding direction of the electrode lead, the width of the lead film covering a front surface of the dented portion may be 2 mm or more.

The thickness of the lead film covering an upper surface of the dented portion may be 100 μm to 300 μm.

The lead film may have gas permeability of 20 Barrer to 60 Barrer at 60° C.

The lead film may have a moisture penetration amount of 0.02 g to 0.2 g for 10 years at 25° C., 50% RH.

There is also provided a battery module according to the following embodiment.

There is provided a battery module, comprising the battery cell.

Advantageous Effects

Since the battery cell includes an electrode lead to which a lead film having a dented portion that is recessed in an outer direction of the battery case and is open toward the inside of the battery case is attached, an external discharge amount of the gas generated inside the battery cell may be improved.

Since the battery cell according includes a coating layer located on the gas discharge portion of the lead film and containing a fluorine-based polymer, the moisture penetration amount into the battery cell may be reduced without affecting the external discharge amount of gas.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
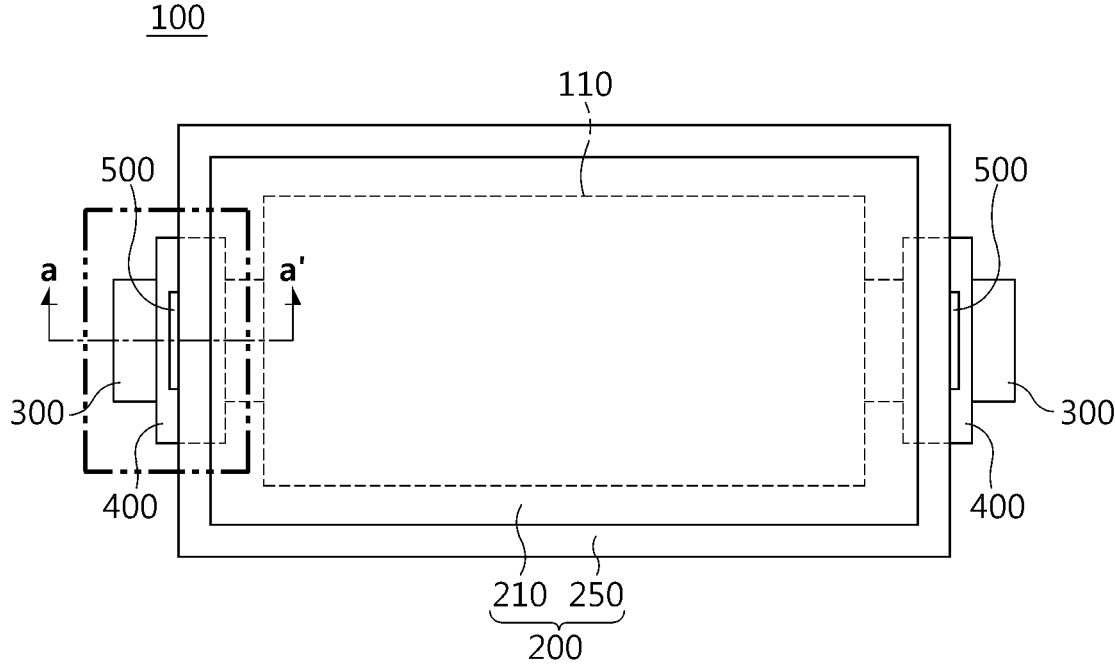
FIG. 1 is a top view showing a battery cell according to an embodiment of the present disclosure.

Hereinafter, the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In order to clearly explain the present disclosure, parts irrelevant to the description are omitted, and identical or similar components are endowed with the same reference signs throughout the specification.

In addition, since the size and thickness of each component shown in the drawings are arbitrarily expressed for convenience of description, the present disclosure is not necessarily limited to the drawings. In order to clearly express various layers and regions in the drawings, the thicknesses are enlarged. Also, in the drawings, for convenience of explanation, the thickness of some layers and regions is exaggerated.

In addition, throughout the specification, when a part "includes" a certain component, it means that other components may be further included, rather than excluding other components, unless otherwise stated.

Hereinafter, a pouch battery cell will be described. However, here, the description will be made based on one of both sides of the pouch battery cell, but it is not necessarily limited thereto, and the same or similar contents may be described in the case of the other side.

The battery cell includes a battery case having an accommodation portion in which an electrode assembly is mounted, and a sealing portion formed by sealing an outer periphery thereof, an electrode lead electrically connected to an electrode tab included in the electrode assembly and protruding out of the battery case through the sealing portion, and a lead film located at a portion corresponding to the sealing portion in at least one of an upper portion and a lower portion of the electrode lead, wherein the lead film has a dented portion recessed in an outer direction of the battery case and opened toward the inside of the battery case, and the battery cell comprises a coating layer located on a gas discharge portion of the lead film and containing a fluorine-based polymer.

FIG. 1 is a top view showing a battery cell according to an embodiment of the present disclosure.

Referring to FIG. 1, a battery cell 100 according to this embodiment includes a battery case 200, an electrode lead 300, and a lead film 400.

The battery case 200 includes an accommodation portion 210 in which an electrode assembly 110 is accommodated, and a sealing portion 250 formed by sealing an outer periphery thereof. The sealing portion 250 may be sealed by heat or laser. The battery case 200 may be a laminate sheet including a resin layer and a metal layer. More specifically, the battery case 200 may be made of a laminate sheet, and may include an outer resin layer forming the outermost layer, a barrier metal layer preventing penetration of materials, and an inner resin layer for sealing.

In addition, the electrode assembly 110 may have a structure of a jelly-roll type (winding type), a stack type (lamination type), or a composite type (stack/folding type). More specifically, the electrode assembly 110 may include a positive electrode, a negative electrode, and a separator disposed therebetween. The positive electrode, the negative electrode, and the separator may have structures and materials commonly used in the art.

Referring to FIG. 1, the electrode lead 300 is electrically connected to an electrode tab (not shown) included in the electrode assembly 110, and protrudes out of the battery case 200 through the sealing portion 250.

Figure 2:
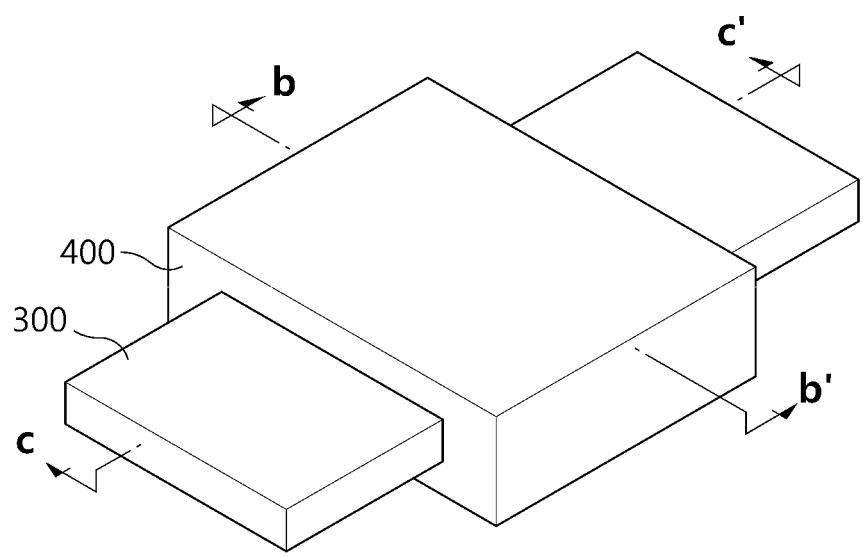
FIG. 2 is a perspective view showing an electrode lead included in the battery cell of FIG. 1.

FIG. 2 is a perspective view showing an electrode lead included in the battery cell of FIG. 1.

Referring to FIG. 2, the lead film 400 is located at a portion corresponding to the sealing portion 250 in at least one of an upper portion and a lower portion of the electrode lead 300. Accordingly, the lead film 400 may improve the sealing properties of the sealing portion 250 and the electrode lead 300 while preventing a short circuit from occurring in the electrode lead 300 during sealing.

Figure 3:
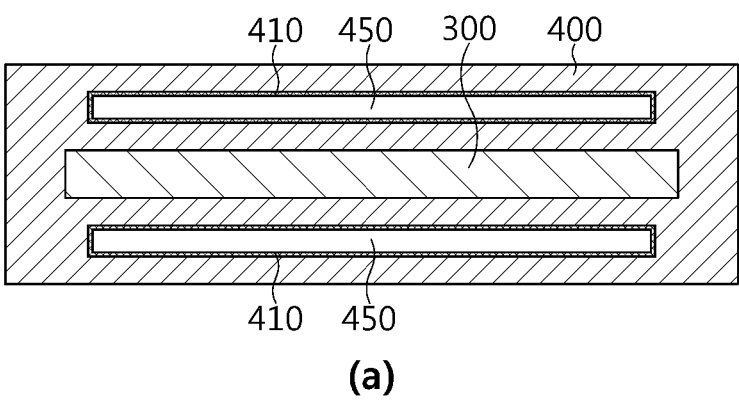
FIG. 3 is a cross-sectional view, taken along the b-b' axis of FIG. 2.
Figure 3:
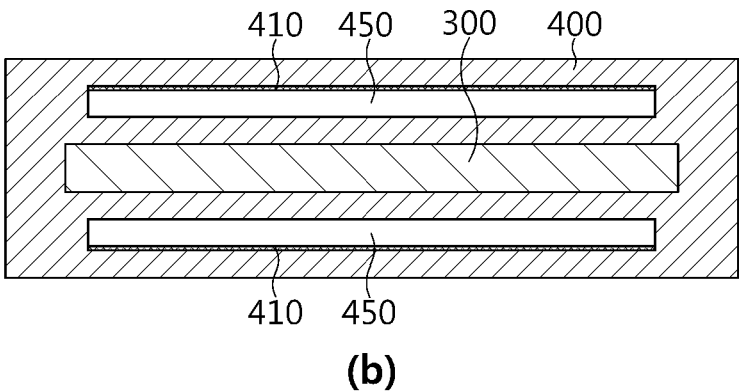
Figure 4:
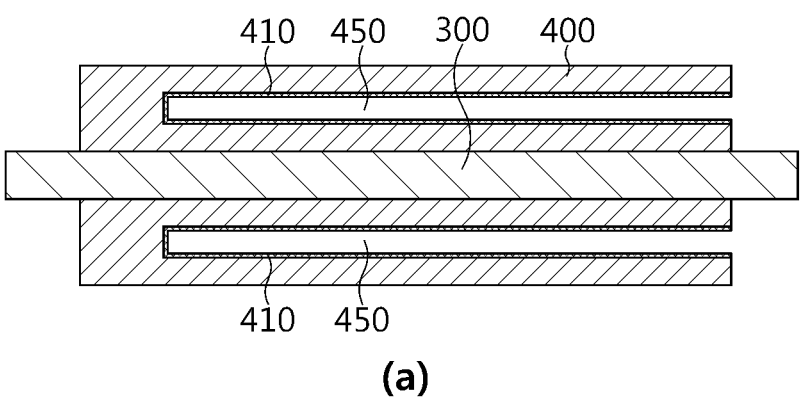
FIG. 4 is a cross-sectional view, taken along the c-c' axis of FIG. 2.
Figure 4:
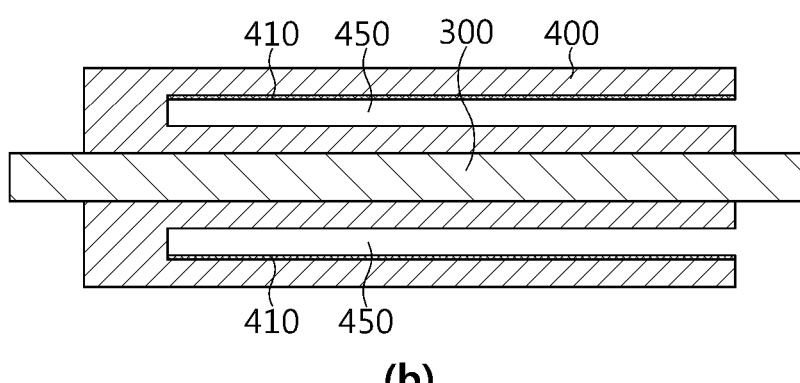

FIG. 3 is a cross-sectional view, taken along the b-b' axis of FIG. 2. FIG. 4 is a cross-sectional view, taken along the c-c' axis of FIG. 2.

Referring to FIGS. 3 and 4, the lead film 400 has a dented portion 450 recessed in the outer direction of the battery case 200, and the dented portion 450 is open toward the inside of the battery case 200. In addition, the inner surface of the dented portion 450 may be closed based on the protruding direction of the electrode lead 300.

Accordingly, in the lead film 400, when the gas generated inside the battery case 200 reaches a predetermined pressure or higher, the gas may be discharged to the dented portion 450, and the gas introduced into the dented portion 450 may be discharged to the outside of the battery according to the pressure difference between the inside and outside. In addition, since the dented portion 450 of the lead film 400 is open to the inside and the inner surface of the dented portion recessed in the outer direction of the lead film 400 is closed, there is an advantage in that the airtightness and durability of the pouch may also be secured. In addition, the lead film 400 may maximize the gas permeation area by the dented portion 450, so that a large amount of gas may be discharged.

Also, referring to FIGS. 3 and 4, the lead film 400 may further include an inner layer 410 covering at least one of inner surfaces of the dented portion 450.

For example, referring to FIGS. 3(*a*) and 4(*a*), within the dented portion 450, the inner layer 410 may cover the entire surface of the lead film 400. That is, the inner layer 410 may be formed on the entire inner surface of the dented portion 450 except for the open surface.

Accordingly, even if the lead film 400 is sealed together with the sealing portion 250 in a state of being located on at least one of the upper and lower portions of the electrode lead 300, the dented portion 450 may be preserved in an unsealed state by the inner layer 410.

As another example, referring to FIGS. 3(*b*) and 4(*b*), the inner layer 410 may cover an upper or lower surface among the inner surfaces of the dented portion 450. That is, the inner layer 410 may be formed on at least one of the upper and lower surfaces of the dented portion 450 facing each other.

Accordingly, while minimizing the inner layer 410 formed in the dented portion 450 of the lead film 400, the dented portion 450 may be preserved in an unsealed state by the inner layer 410. In addition, the manufacturing process may be simplified and the cost may be reduced.

More specifically, the inner layer 410 may be made of a material with a higher melting point than the material of the lead film 400. In addition, the inner layer 410 may be made of a material that does not react with an electrolyte included in the battery case 200. Accordingly, since the inner layer 410 is made of the above material, the dented portion 450 may be preserved or kept blank without reacting separately with the electrolyte and without causing thermal fusion, thermal deformation, or the like during the sealing process.

The inner layer 410 may have a thickness of 100 μm or less.

The gas permeability of the inner layer 410 may be greater than or equal to 40 Barrer. For example, the carbon dioxide permeability of the inner layer 410 may satisfy the above range. In this case, gas may be discharged to the outside more easily.

For example, the inner layer 410 may include at least one of polyolefin-based, fluorine-based, and porous ceramic-based materials. For example, the lead film 400 may include at least one of a polyolefin-based material, a fluorine-based material, and a porous ceramic-based material that satisfies the above gas permeability value. The polyolefin-based material may include at least one material selected from the group consisting of polypropylene, polyethylene, and polyvinyl difluoride (PVDF). The fluorine-based material may include at least one material selected from the group consisting of polytetrafluoroethylene and polyvinylidene fluoride. In addition, the inner layer 410 includes a getter material, so that gas permeability may be increased and moisture permeability may be minimized. For example, the getter material may be calcium oxide (CaO), barium oxide (BaO), lithium chloride (LiCl), silica ($SiO_2$), or the like, without being limited thereto, and any material that reacts with water ($H_2O$) can be used.

The inner layer 410 may include an adhesive material between the lead film 400 and the inner layer 410, or may be extruded together with the lead film 400 to adhere to the lead film 400. The adhesive material may include an acrylic type. In particular, when the inner layer 410 is extruded together with the lead film 400, gas permeability of the inner layer 410 may be 40 Barrer or more.

Referring to FIGS. 2 to 4, the lead film 400 includes a first lead film and a second lead film, the first lead film may be located above the electrode lead 300, and the second lead film may be located below the electrode lead 300. At this time, the electrode lead 300 is sealed together with the sealing portion 250 in a state of being located between the first lead film and the second lead film, so that the first lead film and the second lead film may be connected to each other.

Accordingly, the lead film 400 may improve the sealing property of the sealing portion 250 and the electrode lead 300 while preventing the side surface of the electrode lead 300 from being exposed to the outside.

For example, in the lead film 400, the dented portion 450 may be located in at least one of the first lead film and the second lead film. More specifically, in the lead film 400, the dented portion 450 may be formed on the first lead film or the second lead film based on the electrode lead 300, or the dented portion 450 may be formed on both the first lead film and the second lead film based on the electrode lead 300. However, the number of dented portions 450 is not limited to the above, and the dented portions 450 may be formed in an appropriate number within the lead film 400.

Accordingly, the durability and airtightness of the lead film 400 may be controlled by adjusting the number of dented portions 450 formed on the lead film 400. In addition, if necessary, the number of dented portions 450 may be minimized to simplify the manufacturing process and reduce costs.

In one embodiment of the present disclosure, the gas permeability of the lead film 400 may be 20 Barrer to 60 Barrer, or 30 Barrer to 40 Barrer at 60° C. For example, the carbon dioxide permeability of the lead film 400 may satisfy the above range. In addition, the gas permeability may satisfy the above range at 60° C. based on the thickness of the lead film 400 of 200 μm. If the gas permeability of the lead film 400 satisfies the above range, the gas generated inside the battery may be more effectively discharged.

In this specification, the gas permeability may be measured by ASTM F2476-20.

In one embodiment of the present disclosure, the moisture penetration amount of the lead film 400 may be 0.02 g to 0.2 g, or 0.02 g to 0.04 g, or 0.06 g, or 0.15 g for 10 years at 25° C., 50% RH. If the moisture penetration amount of the lead film 400 satisfies the above range, the penetration of moisture from the lead film 400 may be more effectively prevented.

In this specification, the moisture penetration amount (moisture permeability) may be measured by adopting the ASTM F 1249 method. At this time, the moisture penetration amount may be measured using equipment officially certified by MCOON.

In an example, the lead film 400 may have a gas permeability of 20 Barrer to 60 Barrer at 60° C. and a moisture penetration amount of 0.02 g to 0.2 g at 25° C., 50% RH for 10 years. When the gas permeability and moisture penetration amount of the lead film 400 satisfy the above ranges, it may be more effective to prevent moisture penetration from the outside while discharging the gas generated inside the battery.

In an example, the lead film 400 may include a polyolefin-based resin. For example, the lead film 400 may include a polyolefin-based resin that satisfies the above values of gas permeability and/or moisture penetration amount. The polyolefin-based resin may include one or more materials selected from the group consisting of polypropylene, polyethylene, and polyvinyldifluoride (PVDF). The lead film 400 includes polypropylene, and gas permeability of the lead film 400 may be 20 Barrer to 60 Barrer at 60° C. In addition, the moisture penetration amount may be 0.06 g to 0.15 g. In this case, it is more effective to discharge the gas generated inside the battery, and it may be easy to prevent the penetration of moisture from the outside.

In addition, since the lead film 400 is made of the above-described material, the lead film 400 may maintain the airtightness of the battery cell 100 and prevent leakage of the internal electrolytic solution.

Figure 5:
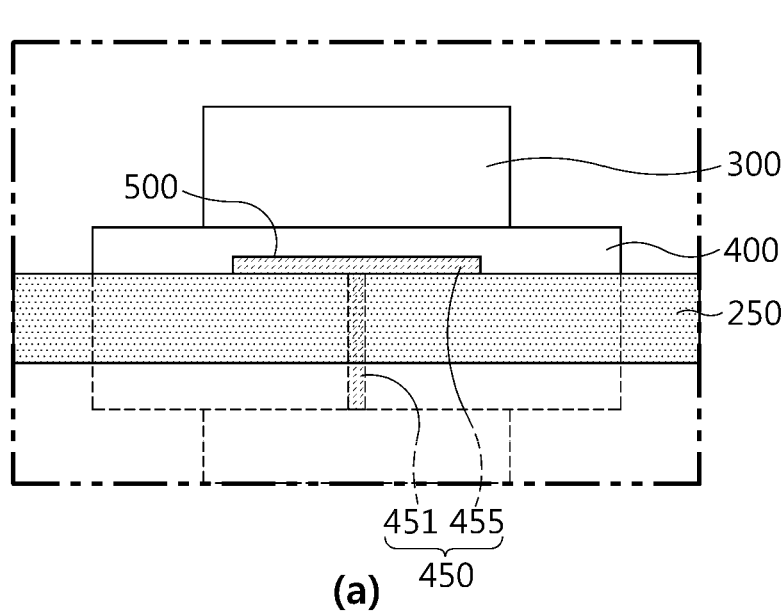
FIG. 5 is an enlarged view showing an electrode lead portion in the battery cell of FIG. 1.
Figure 5:
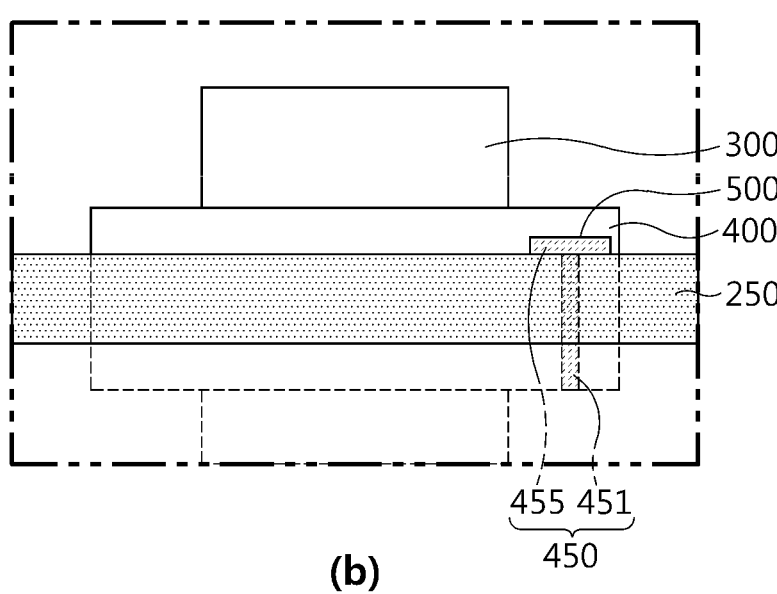

FIG. 5 is an enlarged view showing an electrode lead portion in the battery cell of FIG. 1.

Referring to FIG. 5, a coating layer 500 is positioned on the gas discharge portion of the lead film 400.

When the dented portion 450 is formed on the lead film 400 so that the gas generated inside the battery is discharged to the outside of the battery through the lead film 400, since the gas permeability of the lead film 400 is high, the lead film 400 has high permeability for substances outside the battery, such as moisture, so substances outside the battery may be introduced into the battery. The coating layer 500 has low moisture permeability and thus may reduce the moisture penetration amount penetrating into the battery from the outside of the battery.

The coating layer 500 is located on the gas discharge portion of the lead film 400 and may reduce the moisture penetration amount from the outside of the battery to the inside of the battery while having little effect on the discharge of gas inside the battery to the outside of the battery.

The coating layer 500 may have a thickness of 0.1 μm to 2 mm. When the thickness of the coating layer 500 satisfies the above range, the moisture penetration amount from the outside of the battery to the inside of the battery may be reduced more easily while having little effect on the discharge of gas inside the battery to the outside of the battery. For example, when the thickness of the coating layer 500 is 0.1 μm to 200 μm, the gas discharge amount may be 1 cc/day or more while reducing the moisture penetration amount penetrating into the battery from the outside of the battery. In addition, when the coating layer 500 has a thickness of 200 μm to 2 mm, the gas discharge amount may be 1 cc/day or less while reducing the moisture penetration amount penetrating into the battery from the outside of the battery.

The coating layer 500 includes a fluorine-based polymer. The fluorine-based polymer has high gas permeability and low water permeability, so it may be suitable as a material for the coating layer 500.

The fluorine-based polymer may include repeating units derived from a polymer containing tetrafluoroethylene, vinyl fluoride, vinylidene fluoride, or monomers of two or more thereof. For example, the fluorine-based polymer may include a polymer such as polytetrafluoroethylene, perfluoroalkoxy, and fluorinated ethylene propylene.

The coating layer 500 may be formed by coating a fluorine-based polymer on the gas discharge portion of the lead film 400 by spray coating or vapor deposition, but the method of forming the coating layer 500 on the gas discharge portion of the lead film 400 is not limited thereto.

Referring to FIG. 5, the dented portion 450 may include a first dented portion 451 and a second dented portion 455, and the width of the second dented portion 455 may be greater than that of the first dented portion 451. In this specification, the width of the second dented portion 455 refers to a maximum value of the distance between one end and the other end of the second dented portion 455 in a direction orthogonal to the protruding direction of the electrode lead 300, and the width of the first dented portion 451 refers to a maximum value of the distance between one end and the other end of the first dented portion 451 in a direction orthogonal to the protruding direction of the electrode lead 300.

When the dented portion 450 includes a first dented portion 451 and a second dented portion 455 having different widths, the curvature of the lead film 400 expanded outwardly by a pressure while gas is introduced from the relatively narrow first dented portion 451 is smaller than the curvature of the lead film 400 expanded by a pressure while gas is introduced from the relatively wide second dented portion 455 smaller, so the stress applied to the interface between the lead film 400 and the electrode lead 300 is small, so the durability of the lead film 400 may be improved more easily.

Referring to FIG. 5, the second dented portion 455 may be located farther from the portion where the electrode assembly 110 is accommodated than the first dented portion 451.

At this time, the second dented portion 455 may serve to discharge the gas generated inside the battery case 200 to the outside of the battery case 200, and since the width of the second dented portion 455 is wider than the width of the first dented portion 451, the area through which the gas is discharged to the outside is further increased, so the gas discharge amount may be increased more easily. In addition, the relatively narrow first dented portion 451 may serve as a passage through which the gas generated inside the battery case 200 is introduced into the dented portion 450, and may increase durability of the lead film 400.

Referring to FIG. 5, a part of the first dented portion 451 may be located at a position corresponding to the sealing portion 250. For example, a part of the first dented portion 451 may be located at a position corresponding to the sealing portion 250 while the second dented portion 455 is located further from the portion where the electrode assembly 110 is accommodated than the first dented portion 451.

Referring to FIG. 5, a part of the second dented portion 455 may be located at a position that does not correspond to the sealing portion 250. For example, while the second dented portion 455 is located further from the portion where the electrode assembly 110 is accommodated than the first dented portion 451, a part of the second dented portion 455 may be located at a position that does not correspond to the sealing portion 250.

In this case, as the area where the second dented portion 455 does not correspond to the sealing portion 250 increases, the area where gas inside the battery case 200 is discharged to the outside of the battery case 200 may increase.

The width of the lead film 400 may be greater than the width of the sealing portion 250, but may be less than the length of the electrode lead 300. In this specification, the width of the lead film 400 refers to a maximum value of the distance between one end and the other end of the lead film in the protruding direction of the electrode lead 300. The width of the sealing portion 250 refers to a maximum value of the distance between one end and the other end of the sealing portion 250 in the protruding direction of the electrode lead 300. The length of the electrode lead 300 refers to a maximum value of the distance between one end and the other end of the electrode lead 300 in the protruding direction of the electrode lead 300. In this case, the second dented portion 455 may be positioned between the end of the sealing portion 250 and the end of the lead film 400. For example, the second dented portion 455 may be entirely located at a position that does not correspond to the sealing portion 250.

In the lead film 400, the dented portion 450 may be formed in various shapes.

Referring to FIG. 5, the first dented portion 451 may extend along the protruding direction of the electrode lead 300, and the second dented portion 455 may extend along the longitudinal direction of the sealing portion 250. In this specification, the longitudinal direction of the sealing portion 250 refers to a direction orthogonal to the protruding direction of the electrode lead 300. However, the shape of the dented portion 450 is not limited to the above, and the dented portion 450 may be formed in an appropriate shape within the lead film 400.

Referring to FIG. 5, one end of the first dented portion 451 is open toward the outside of the battery case 200, and the other end of the first dented portion 451 may communicate with the second dented portion 455. More specifically, the first dented portion 451 and the second dented portion 455 may be integrated with each other. That is, the second dented portion 455 may serve as a gas outlet through which the gas introduced into the dented portion 450 is discharged to the outside, and the first dented portion 451 serves as a gas inlet through which the gas generated in the battery case 200 is introduced.

Referring to FIG. 5, a coating layer 500 may be positioned on the second dented portion 455. As another example, the coating layer 500 may also be positioned on a boundary line between the first dented portion 451 and the second dented portion 455. Since the second dented portion 455 serves as a gas outlet through which the gas inside the battery is discharged to the outside, when the coating layer 500 is located on the second dented portion 455, the moisture penetration amount into the battery cell may be more easily reduced without affecting the external discharge amount of the gas.

More specifically, the coating layer 500 may extend along the longitudinal direction of the second dented portion 455. Here, the length of the second dented portion 455 means a maximum value of the distance between one end and the other end of the second dented portion 455 in a direction orthogonal to the protruding direction of the electrode lead 300. In addition, the length of the coating layer 500 may be equal to or greater than the length of the second dented portion 455. In this specification, the length of the coating layer 500 means a maximum value of the distance between one end and the other end of the coating layer 500 in a direction orthogonal to the protruding direction of the electrode lead 300.

Also, the width of the coating layer 500 may be equal to or greater than the width of the second dented portion 455. Here, the width of the second dented portion 455 means a maximum value of the distance between one end and the other end of the second dented portion 455 in the protruding direction of the electrode lead 300. The width of the coating layer 500 means a maximum value of the distance between one end and the other end of the coating layer 500 in the protruding direction of the electrode lead 300.

However, the size of the coating layer 500 is not limited to the above, and the coating layer 500 may be formed in an appropriate size within the lead film 400.

Referring to FIG. 5, the dented portion 450 may be formed at various positions based on the electrode lead 300.

For example, as shown in FIG. 5(*a*), in the lead film 400, the dented portion 450 may be positioned on the electrode lead 300. More specifically, the dented portion 450 may be formed at a position corresponding to the center of the electrode lead 300.

As another example, as shown in FIG. 5(*b*), the length of the lead film 400 may be greater than the width of the electrode lead 300, and the dented portion 450 may be located between the end of the electrode lead 300 and the end of the lead film 400. In this specification, the length of the lead film 400 means a maximum value of the distance between one end and the other end of the lead film 400 in a direction orthogonal to the protruding direction of the electrode lead 300, and the width of the electrode lead 300 means a maximum value of the distance between one end and the other end of the electrode lead 300 in a direction orthogonal to the protruding direction of the electrode lead 300. In other words, in the lead film 400, the dented portion 450 may be formed at a position avoiding the electrode lead 300. However, the position of the dented portion 450 is not limited to the above, and the dented portion 450 may be formed at an appropriate position within the lead film 400.

Accordingly, the durability and airtightness of the lead film 400 may be controlled by adjusting the position of the dented portion 450 formed on the lead film 400. In addition, if necessary, the size of the dented portion 450 may be adjusted according to the position of the dented portion 450, thereby simplifying the manufacturing process and reducing costs.

Referring to FIG. 5, the end of the lead film 400 open toward the inside of the dented portion 450 is formed adjacent to the end of the lead film 400, and the end of the lead film 400 recessed toward the outside may be located between the end of the sealing portion 250 and the end of the lead film 400. In addition, the end of the dented portion 450 that is recessed toward the outside may be spaced apart from the end of the sealing portion 250 by a predetermined distance or may be located adjacent thereto.

Figure 6:
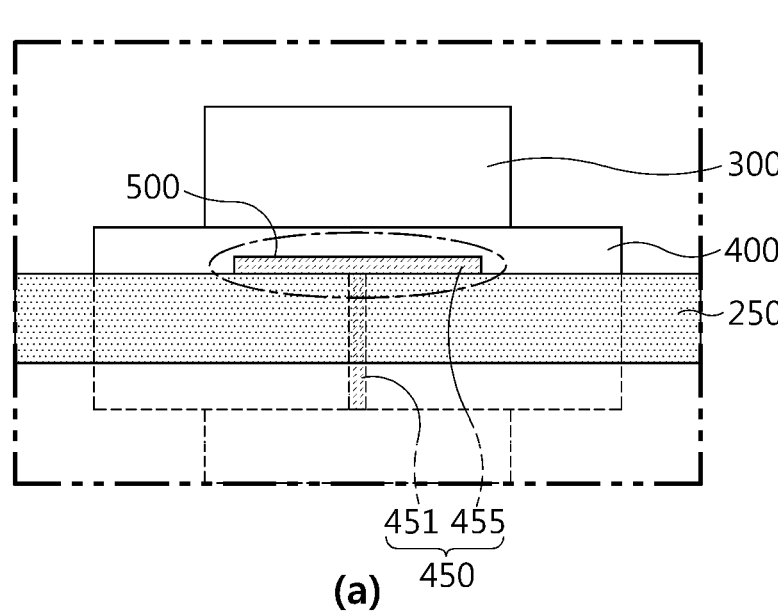
FIG. 6 is an enlarged view showing an electrode lead portion according to a location of a sealing portion in FIG. 5(a).
Figure 6:
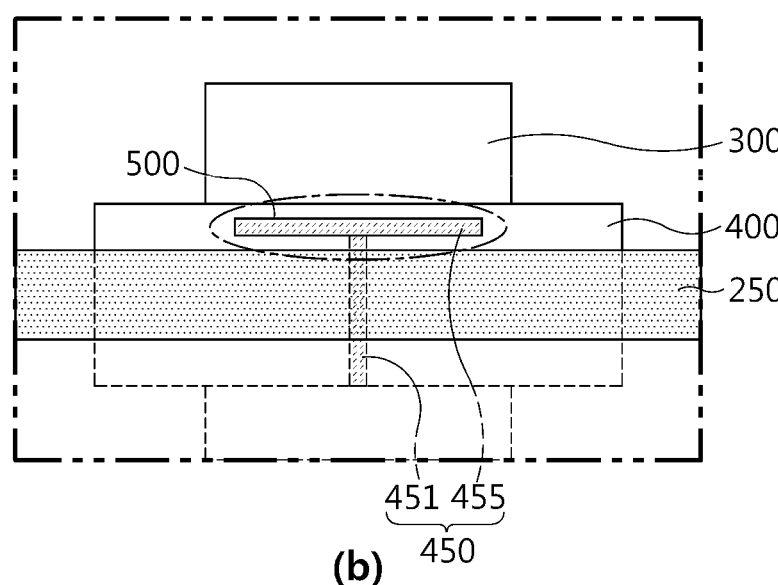

FIG. 6 is an enlarged view showing an electrode lead portion according to a location of a sealing portion in FIG. 5(*a*).

As an example, comparing FIGS. 6(*a*) and 6(*b*), even if the position of the sealing portion 250 in contact with the lead film 400 is changed, it may be confirmed that there is no effect on the end of the dented portion 450 that is recessed toward the outside.

Accordingly, within the error range according to the positions of the lead film 400 and the sealing portion 250 generated during the sealing process, the end of the dented portion 450 recessed toward the outside may uniformly maintain the area located outside the battery case 200, and the area through which the gas in the battery case 200 may be introduced into and discharged to the outside of the dented portion 450 may also be maintained uniformly. Accordingly, there is an advantage that the gas discharge effect by the dented portion 450 may be maintained.

Figure 7:
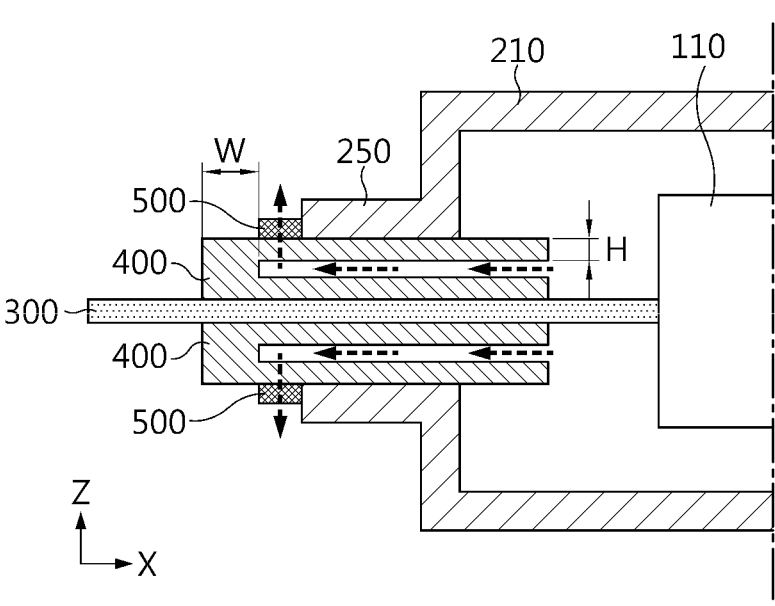
FIG. 7 is a cross-sectional view, taken along the a-a' axis of FIG. 1.

FIG. 7 is a cross-sectional view, taken along the a-a' axis of FIG. 1.

Referring to FIG. 7, the gas generated inside the battery cell 100 may be discharged to the dented portion 450 of the lead film 400. Here, since the dented portion 450 is open toward the inside, the pressure inside the dented portion 450 may be the same as the pressure inside the battery case 200.

The pressure inside the dented portion 450 is higher than the pressure outside the battery cell 100, and the resulting pressure difference may act as a driving force of the gas. Accordingly, the gas introduced into the dented portion 450 may be easily discharged to the outside. In addition, an external discharge amount of gas generated inside the battery cell 100 may also be increased. At this time, the gas generated inside the battery case 200 may be discharged along the Z-axis direction through the dented portion 450 and the lead film 400 covering the upper surface of the dented portion.

Referring to FIG. 7, the gas discharge portion of the lead film 400 may be located outer than the outer surface of the battery case 200. In this specification, the outer surface of the battery case 200 refers to the end of the sealing portion 250 of the battery case 200 outer of the battery.

In addition, the end of the dented portion 450 that is open toward the inside of the battery case 200 may be located inner than the inner surface of the battery case 200. In this specification, the inner surface of the battery case 200 means the end of the sealing portion 250 of the battery case 200 inside the battery.

Accordingly, the lead film 400 may maximize the area of the dented portion 450, thereby maximizing the permeation area of the gas generated inside the battery case 200, so that a large amount of gas can be discharged.

For example, when the recessed end of the dented portion 450 is located outer than the outer surface of the battery case 200, the gas may be discharged from the dented portion 450 along the Z-axis direction through the lead film 400 between the recessed end of the dented portion 450 and the outer surface of the battery case 200.

In one example, the gas permeability of the lead film 400 may be 20 Barrer to 60 Barrer, or 30 Barrer to 40 Barrer at 60° C. For example, the carbon dioxide permeability of the lead film 400 may satisfy the above range. In addition, the gas permeability may satisfy the above range at 60° C. based on the thickness of the lead film 400 of 200 μm. If the gas permeability of the lead film 400 satisfies the above range, the gas generated inside the secondary battery may be more effectively discharged.

In this specification, the gas permeability may be measured by ASTM F2476-20.

The moisture penetration amount of the lead film 400 may be 0.02 g to 0.2 g, or 0.02 g to 0.04 g, or 0.06 g, or 0.15 g for 10 years at 25° C., 50% RH. If the moisture penetration amount of the lead film 400 satisfies the above range, the penetration of moisture from the lead film 400 may be more effectively prevented.

In another example, the lead film 400 may have a gas permeability of 20 Barrer to 60 Barrer at 60° C. and a moisture penetration amount of 0.02 g to 0.2 g at 25° C., 50% RH for 10 years. When the gas permeability and moisture penetration amount of the lead film 400 satisfy the above ranges, it may be more effective to prevent moisture penetration from the outside while discharging the gas generated inside the battery.

The moisture penetration amount of the lead film 400 may be measured by adopting the ASTM F 1249 method. At this time, the moisture penetration amount may be measured using equipment officially certified by MCOON.

The lead film 400 may include a polyolefin-based resin. For example, the lead film 400 may include a polyolefin-based resin that satisfies the above values of gas permeability and/or moisture penetration amount. The polyolefin-based resin may include one or more materials selected from the group consisting of polypropylene, polyethylene, and polyvinyldifluoride (PVDF). The lead film 400 includes polypropylene, and gas permeability of the lead film 400 may be 20 Barrer to 60 Barrer at 60° C. In addition, the moisture penetration amount may be 0.06 g to 0.15 g. In this case, it is more effective to discharge the gas generated inside the battery, and it may be easy to prevent the penetration of moisture from the outside.

In addition, since the lead film 400 is made of the above-described material, the lead film 400 may maintain the airtightness of the battery cell 100 and prevent leakage of the internal electrolytic solution.

Referring to FIG. 7, the coating layer 500 is positioned on the gas discharge portion of the lead film 400. The coating layer 500 is located on the gas discharge portion of the lead film 400 and may reduce the moisture penetration amount from the outside of the battery to the inside of the battery while having little effect on the discharge of gas inside the battery to the outside of the battery.

Referring to FIG. 7, the thickness H of the lead film 400 covering the upper surface of the dented portion 450 may be 100 μm to 300 μm, or 100 μm to 200 μm. When the thickness H of the lead film 400 covering the upper surface of the dented portion 450 satisfies the above range, the gas inside the battery case 200 may be more easily discharged to the outside. In this specification, the upper surface of the dented portion 450 refers to the lead film 400 between the dented portion 450 and the electrode lead 300.

Referring to FIG. 7, based on the protruding direction of the electrode lead 300, the width W of the lead film 400 covering the front surface of the dented portion 450 may be 2 mm or more, or 2 mm to 3 mm. In this specification, the width of the lead film 400 surrounding the front surface of the dented portion 450 means a maximum value of the distance between the recessed end of the dented portion 450 and the outer end of the battery case 200 of the lead film 400. When the width W of the lead film 400 surrounding the front surface of the dented portion 450 satisfies the above range, it may be more easy to prevent the lead film 400 from being torn in the process of discharging the gas generated inside the battery case 200 to the outside.

A battery module may include the battery cell described above. Meanwhile, one or more battery modules may be packaged in a pack case to form a battery pack.

The battery module described above and the battery pack including the same may be applied to various devices. These devices may be transportation means such as electric bicycles, electric vehicles, hybrid electric vehicles, and the like, but the present disclosure is not limited thereto, and the present disclosure may be applied various devices that can use a battery module and a battery pack including the same, which is also within the scope of the right of the present disclosure.

Although a preferred embodiment of the present disclosure has been described in detail above, the scope of the right of the present disclosure is not limited thereto, and various modifications and improvements made by those skilled in the art using the basic concept of the present disclosure defined in the appended claims also fall within the scope of the right of the present disclosure.

REFERENCE SIGNS

100: battery cell
110: electrode assembly
200: battery case
210: accommodation portion
250: scaling portion
300: electrode lead
400: lead film
410: inner layer
450: dented portion
451: first dented portion
455: second dented portion
500: coating layer

What is claimed is:

1. A battery cell, comprising:
a battery case having an accommodation portion in which an electrode assembly is mounted, and a sealing portion formed by sealing an outer periphery thereof;
an electrode lead electrically connected to an electrode tab included in the electrode assembly and protruding out of the battery case through the sealing portion;
a lead film located at a portion corresponding to the sealing portion in at least one of an upper portion or a lower portion of the electrode lead, the lead film having a dented portion defined by a recessed opening in an outer direction of the battery case and opened toward the accommodation portion of the battery case, the dented portion extending from the accommodation portion along the lead film such that at least a portion of the dented portion extends beyond the sealing portion, the opening being disposed within the lead film such that the opening is encased by the lead film;
the lead film covers a front surface of the dented portion and an upper surface of the dented portion based on the protruding direction of the electrode lead, a gas generated inside the battery case is discharged to the outside of the battery case through the dented portion and the lead film covering the upper surface of the dented portion, and
a coating layer located on a gas discharge portion of the lead film, the coating layer containing a fluorine-based polymer,
wherein the dented portion being formed entirely within the lead film and not in the electrode lead, the coating being disposed directly on a surface of the dented portion of the lead film.

2. The battery cell according to claim 1,
wherein the gas discharge portion of the lead film is located outside an outer surface of the battery case.

3. A battery cell, comprising:
a battery case having an accommodation portion in which an electrode assembly is mounted, and a sealing portion formed by sealing an outer periphery thereof;
an electrode lead electrically connected to an electrode tab included in the electrode assembly and protruding out of the battery case through the sealing portion;
a lead film located at a portion corresponding to the sealing portion in at least one of an upper portion or a lower portion of the electrode lead, the lead film having a dented portion defined by a recessed opening in an outer direction of the battery case and opened toward the accommodation portion of the battery case, the dented portion extending from the accommodation portion along the lead film such that at least a portion of the dented portion extends beyond the sealing portion, the opening being disposed within the lead film such that the opening is encased by the lead film, and
a coating layer located on a gas discharge portion of the lead film, the coating layer containing a fluorine-based polymer,
wherein the dented portion includes a first dented portion and a second dented portion, and
the second dented portion has a greater width than the first dented portion,
wherein the dented portion being formed entirely within the lead film and not in the electrode lead, the coating being disposed directly on an outer wall surface of the dented portion of the lead film.

4. The battery cell according to claim 3,
wherein the second dented portion is located farther from the accommodation portion than the first dented portion.

5. The battery cell according to claim 3,
wherein a part of the first dented portion is located in an area corresponding to the sealing portion.

6. The battery cell according to claim 3,
wherein a part of the second dented portion is located in an area that does not correspond to the sealing portion.

7. The battery cell according to claim 3,
wherein an end of the second dented portion is located outside an outer surface of the battery case.

8. The battery cell according to claim 3,
wherein the second dented portion is located between an end of the sealing portion and an end of the lead film.

9. The battery cell according to claim 3,
wherein the coating layer is located directly on an outer wall surface of the second dented portion, the coating layer covering substantially an entire length and width of the second dented portion and extending no more than 1 mm beyond a perimeter of the second dented portion, the coating layer having a thickness of 0.1 μm to 200 μm.

10. The battery cell according to claim 3, wherein the first dented portion extends along a protruding direction of the electrode lead, and the second dented portion extends along a longitudinal direction of the sealing portion.

11. The battery cell according to claim 1, wherein the fluorine-based polymer includes a polymer containing repeating units derived from tetrafluoroethylene, vinyl fluoride, vinylidene fluoride, or monomers of a combination thereof.

12. A battery cell, comprising:

a battery case having an accommodation portion in which an electrode assembly is mounted, and a sealing portion formed by sealing an outer periphery thereof;

an electrode lead electrically connected to an electrode tab included in the electrode assembly and protruding out of the battery case through the sealing portion;

a lead film located at a portion corresponding to the sealing portion in at least one of an upper portion or a lower portion of the electrode lead, the lead film having a dented portion defined by a recessed opening in an outer direction of the battery case and opened toward the accommodation portion of the battery case, the dented portion extending from the accommodation portion along the lead film such that at least a portion of the dented portion extends beyond the sealing portion, the opening being disposed within the lead film such that the opening is encased by the lead film, and a coating layer located on a gas discharge portion of the lead film, the coating layer containing a fluorine-based polymer, wherein based on a protruding direction of the electrode lead, an inner surface of the dented portion is closed, the dented portion being formed entirely within the lead film and not in the electrode lead, the coating being disposed directly on an outer wall surface of the dented portion of the lead film.

13. The battery cell according to claim 12, further comprising:

an inner layer configured to cover at least one inner surface of the dented portion of the lead film.

14. The battery cell according to claim 13, wherein the inner layer comprises a material having a higher melting point than the lead film, and the material of the inner layer does not react with an electrolyte.

15. The battery cell according to claim 14, wherein the material of the inner layer includes at least one polyolefin-based, fluorine-based, or porous ceramic-based material.

16. The battery cell according to claim 1, wherein the dented portion is located on the electrode lead.

17. The battery cell according to claim 1, wherein a length of the lead film is greater than a width of the electrode lead.

18. The battery cell according to claim 17, wherein the dented portion is located between an end of the electrode lead and an end of the lead film.

19. The battery cell according to claim 1, wherein an end of the dented portion that is open toward the accommodation portion of the battery case is located inward of an innermost surface of the sealing portion of the battery case.

20. A battery module, comprising the battery cell according to claim 1.

* * * * *